United States Patent [19]

Kammeraad

[11] Patent Number: 5,304,704
[45] Date of Patent: Apr. 19, 1994

[54] METHOD AND APPARATUS FOR SOIL REMEDIATION

[76] Inventor: Norman Kammeraad, 6923 48th Ave., Hudsonville, Mich. 49426

[21] Appl. No.: 864,568

[22] Filed: Apr. 7, 1992

[51] Int. Cl.$^5$ .................. B08B 7/00; B01D 43/00
[52] U.S. Cl. .................... 588/249; 405/128; 405/264; 210/749; 210/909
[58] Field of Search .......... 588/249, 252, 255; 405/128, 129, 258, 263, 264; 210/643, 638, 708, 749, 909

[56] References Cited

U.S. PATENT DOCUMENTS

| | | | |
|---|---|---|---|
| 3,779,907 | 12/1973 | Li et al. | 210/643 X |
| 4,253,951 | 3/1981 | McCune | 210/749 |
| 4,555,343 | 11/1985 | Bauer et al. | 210/643 |
| 4,599,117 | 7/1986 | Luxemburg | 210/708 X |
| 4,782,625 | 11/1988 | Gerken et al. | 47/1.42 |
| 4,846,934 | 7/1989 | Carberry | 210/747 X |
| 4,927,293 | 5/1990 | Campbell | 405/128 |
| 4,951,417 | 8/1990 | Gerken et al. | 47/1.42 |
| 4,966,654 | 10/1990 | Carberry | 202/177 |
| 4,978,508 | 12/1990 | Hansen et al. | 422/186.08 |
| 4,979,886 | 12/1990 | Rippberger | 422/129 |
| 4,997,313 | 3/1991 | Gibson et al. | 405/128 |
| 5,055,196 | 10/1991 | Darian et al. | 210/638 |
| 5,061,119 | 10/1991 | Balthaus et al. | 405/128 |
| 5,122,194 | 6/1992 | Miller et al. | 210/909 X |

OTHER PUBLICATIONS

Material Safety Data Sheet for Control Solve 228, Published Feb. 15, 1991.
Midland Asphalt Corp. Midland-Mix Trailer Calibration Sheet Brochure-Publication Date Unknown.
Bio Solve Product Brochure, Jan. 1, 1991.
Public Acts of 1982, Sec. 299.601 et seq. of the Michigan Compiled Laws, p. 1, May 21, 1990.
Leaking Underground Storage Tank Act, Act No. 478, P.A. of 1988 as Amended by Act 150 of 1989.

*Primary Examiner*—David H. Corbin
*Assistant Examiner*—Arlen L. Olsen
*Attorney, Agent, or Firm*—Basile and Hanlon

[57] ABSTRACT

A process of soil remediation in which an encapsulation solution is introduced into contact with a soil matrix containing chemical contaminants such as polynucleated aromatics in an amount sufficient to form a saturated admixture of the soil matrix and the encapsulation solution, the encapsulation solution being capable of preferentially attracting the chemical contaminants contained in the soil matrix, and containing an effective amount of non-ionic surfactant material and water; and the admixture is admixed for an interval sufficient to permit the chemical contaminants to preferentially dissociate from contact with the soil matrix in favor of association with the encapsulation solution. Once this occurs, the encapsulation solution with associated chemical contaminants can be removed from contact with the soil matrix.

19 Claims, 2 Drawing Sheets

METHOD AND APPARATUS FOR SOIL REMEDIATION

FIELD OF THE INVENTION

The present invention relates to soil remediation. More specifically, the present invention pertains to a method and apparatus which can be employed to reduce or eliminate undesirable chemical contaminants from soil by bioencapsulation and biodegradation.

BACKGROUND OF THE INVENTION

In the past two decades, the problem of soil contamination has been recognized as being pronounced, extensive and acute; both in the United States and abroad. Clean-up of both accidentally and intentionally contaminated soil has been mandated by federal, state, and local governments. The complexity of the task of soil remediation is compounded by the wide variance among contaminated sites. It cannot be guaranteed that any two clean-up sites will contain soil having the same characteristics; be exposed to similar climatic or geological conditions; or even have similar chemical contaminants present at even roughly the same concentrations. Wide variations can occur from site to site or even from location to location within the same clean-up site.

Thus the methodology for each clean-up effort must be specifically designed to meet the conditions found at the given site. Various processing methods implemented in the past have met with limited success. Volatile or volitalizable contaminants can be removed by a variety of reactive or evaporative processes. These processes generally entail the use of absorbent and/or oxidizing reactant materials which react with the volatilizable organics to form reaction by-products which are more environmentally acceptable than the original contaminants. Such systems generally entail heating the soil matrix or subjecting it to other physical procedures to volatilize the contaminants to remove them from the soil matrix.

Many chemical contaminants are not readily volatilizable and therefore are not amenable to reactive and/or evaporative processes as previously described These contaminants include, but are not limited to, various substituted and non-substituted poly-and mono-aromatic hydrocarbons; for example, polyhalogenated biphenyls and the like. Irradiation of contaminated solid material such as soil has been proposed as a method for reduction of certain specific contaminants such as polyhalogenated biphenyls such as PBB and PCB. However, such procedure are costly and time consuming. In addition, such treatment methods are of limited use for use in soil matrices containing high concentrations of a wide variety of contaminants.

Extraction processes have been proposed to remove chemical contaminants from soil and sludge. Such methods generally involve contacting water wet soil/sludge with suitable water-insoluble solvents in which the contaminants are preferentially soluble. The solvent containing contaminants is separated from the solid and the solvent and contaminants then separated from one another.

Because no universally effective remediation method has been proposed, on-site soil remediation has been essentially impossible in many cases. Clean-up and remediation efforts up to the present have concentrated on removal of contaminated soil from the site to either secure containment landfills or to incineration facilities. This is both expensive and sacrifices productive topsoil which, if remediated, could possibly support vegetative growth.

It would be highly desirable to provide a remediation method which could be employed effectively with a variety of different contaminated matrices such as water, soil, bio-solids, and the like to remove a variety of classes of chemical contaminants. It is also desirable that the contaminant removal process be one which can be accomplished in a continuous manner at or near the clean-up site. Furthermore, it is highly desirable that the remediation process be one which is capable of reducing the level of contaminants present in various matrices, particularly in soil to a level below that which is mandated in the applicable environmental regulations, with reduction in contaminant concentrations to levels below current detection limits.

SUMMARY OF THE INVENTION

The present invention is a process and device for remediation either on or near the source of the contaminated matrix material or at locations remote therefrom in which significant portions of various organic compounds can be removed from association with the matrix in a manner which ultimately is capable of reducing the concentration of these target contaminants to levels at or below those mandated by the applicable state, local, or federal environmental regulatory agencies. If desired, the process of the present invention can be employed to reduce the levels of targeted chemical contaminants to levels below the detection limits of analytical instruments currently employed.

The contaminated matrix may be a liquid material such as underground or above-ground water or fluidizable solid materials such as soil, bio-solids and the like. While the remediation process of the present invention is described in particular as it relates to soil processing, it is to be understood that the process of the present invention may be successfully employed on other fluid or fluidizable contaminated media such as bio-solids, water and the like.

In the remediation process of the present invention, a quantity of encapsulation solution sufficient to saturate the matrix to be treated is brought into contact with material containing targeted chemical contaminants. The encapsulation solution employed is capable of preferentially attracting the targeted chemical contaminants contained in the matrix, isolating a significant portion of the chemicals therefrom, and rendering both the isolated contaminants and the non-isolated contaminants amenable to decompositional processes. The encapsulation solution consists essentially of a non-ionic surfactant material dispersed in water.

In the preferred embodiment, the resulting admixture is agitated for an interval sufficient to permit ultimate contact between the encapsulation solution and the target chemical contaminants to preferentially dissociate the contaminants from contact with the matrix in favor of association with the encapsulation solution. Major portions of the encapsulation solution with target chemical contaminants associated therewith can be removed from contact with the matrix, yielding a treated matrix which is essentially free of chemical contaminants.

The soil remediation device of the present invention comprises a mixing hopper having at least one pair of counter-rotating mixing blades mounted therein. In the preferred embodiment, a shredding pug milling device is employed. The device of the present invention also has suitable means for soil introduction and means for introducing encapsulation solution into the mixing hopper associated therewith.

DESCRIPTION OF THE DRAWING

Throughout the description reference is made to the following drawing figures in which like reference numerals refer to the respective elements throughout the various views and in which.

BRIEF DESCRIPTION OF THE PREFERRED EMBODIMENT

Figure 1:
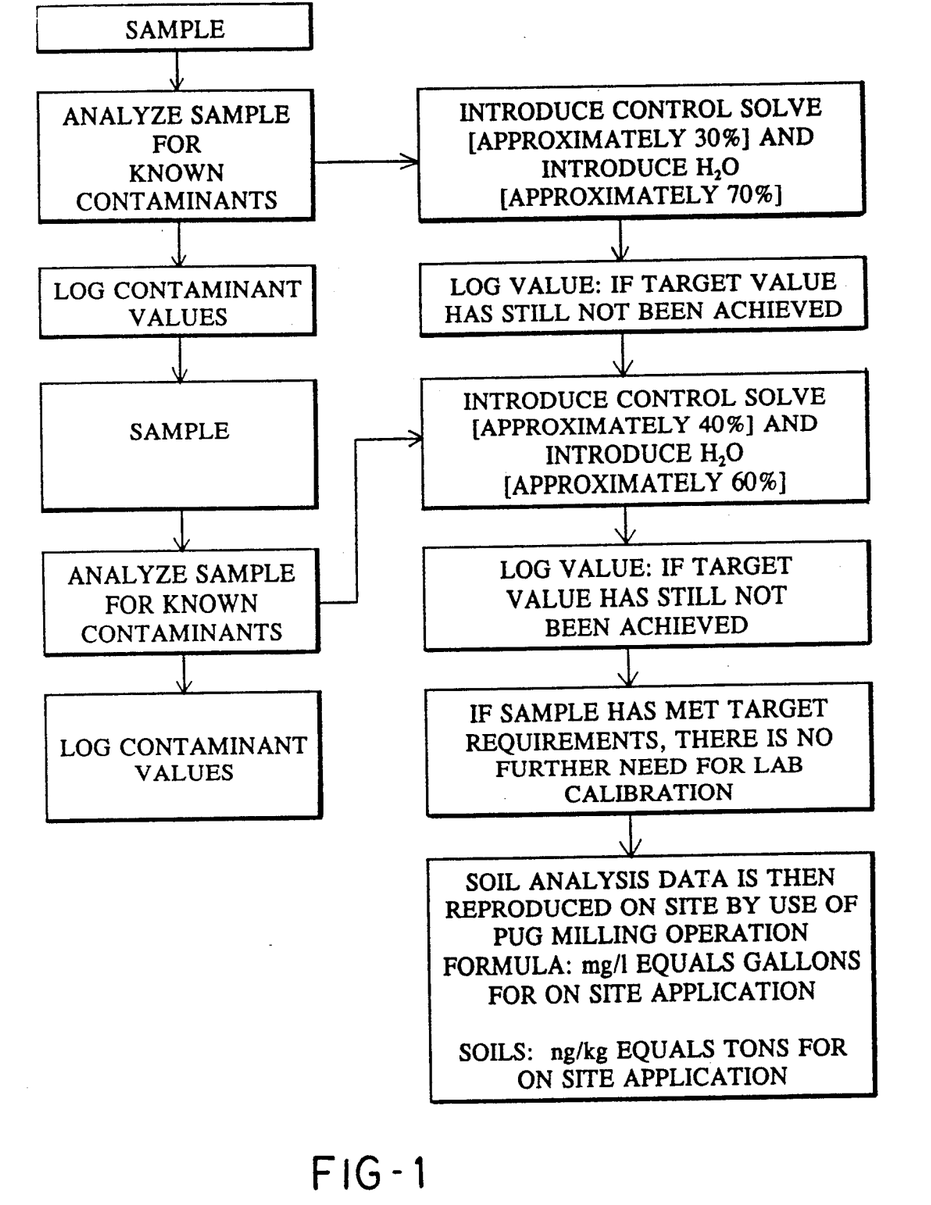
FIG. 1 is a schematic flow diagram of the process of the present invention.
Figure 2:
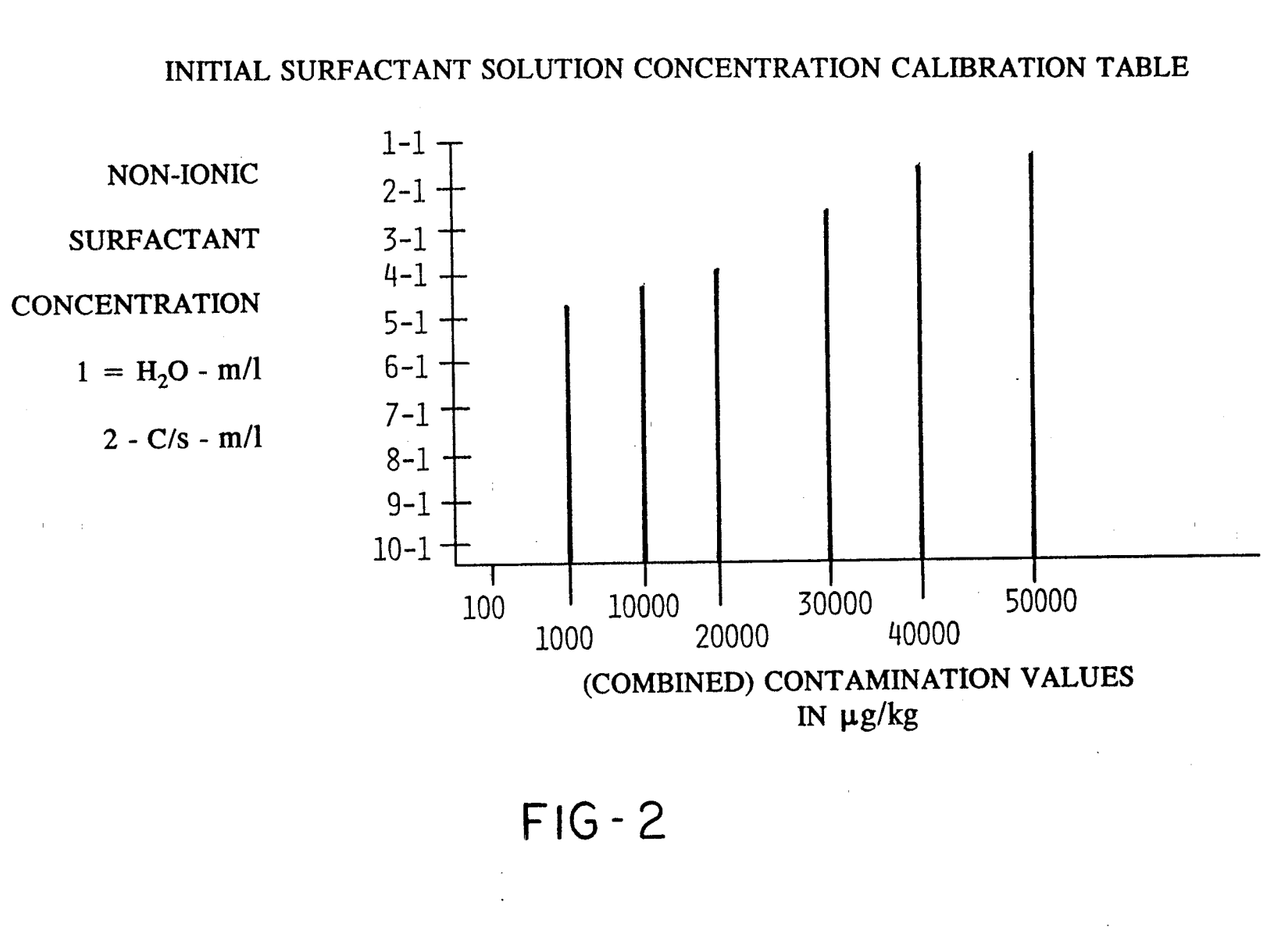
FIG. 2 is a graphic representation of the relationship between contaminant concentration and concentration of surfactant in calibration use solution standard.

The present invention is predicated on the discovery that various formulations consisting essentially of non-ionic surfactant and water effectively reduce or eliminate significant concentrations of chemical contaminants present in various matrices. The matrices which can be successfully treated in the process of the present invention can be either fluids such as water or fluidizable materials such as soil. Previously, it was widely held that such non-ionic surfactant compositions were effective only for fire-control and small-scale surface spill control and containment but were largely ineffective on deep, permeated contaminant materials.

The present invention is a process and apparatus for on-site or remote remediation in which large quantities of contaminated matrix are contacted with sufficient quantities of a suitable encapsulation solution to provide ultimate contact between the matrix and the solution. The encapsulation solution consists essentially of organic compounds in water. The organic compounds are capable of preferentially dissociating target chemical contaminants from interaction with the matrix and bonding the contaminants to constituents in the encapsulation solution. The bonding which takes place may be either chemical or physical interaction between the two materials.

The matrix to be treated can be any material which is either a fluid such as water or fluidizable such as various soils, bio-solids and the like. For purposes of discussion herein the matrix treated is soil.

In the preferred embodiment, the encapsulation solution is introduced into contact with the soil to be treated in a manner which insures intimate contact between the two materials. After contact is complete, a major portion of the encapsulation solution containing at least a portion of the target chemical contaminants can be removed by any suitable means and the remediated soil reinstalled in the desired location. A portion of the encapsulation solution may remain in the soil matrix after reinstallation to continue to act on contaminants in situ.

The encapsulation solution employed in the process of the present invention is, preferably, an aqueous material containing sufficient concentrations of non-ionic surfactant or mixture of non-ionic surfactants to interact with the targeted chemical contaminants and preferentially dissociate the same from contact with the soil matrix.

The non-ionic surfactant material successfully employed herein is a compound or compound complex essentially insoluble in water which is readily dispersible therein. In the preferred embodiment, the non-ionic surfactant is a material which is capable of forming a stable emulsion or emulsion-like state in water.

Suitable non-ionic surfactants include materials having an HLB (Hydrophile-Lipophile Balance; the relative simultaneous attraction of an emulsifier for two phases of an emulsion system) value between about 0 and about 13.5, with values between about 3.5 and about 20.0 being preferred. The non-ionic surfactants advantageously employed herein are generally polyoxyethylene esters of higher fatty acid having from about 8 to 22 carbon atoms in the acyl group and from about 8 to 30 ethenoxy unit in the oxyethylene portion. Typical products are polyoxyethylene adducts of tall oil, rosin acid, stearic and oleic acids, materials derived from vegetative fatty oils such as cashew oil, almond oil and the like. Additional non-ionic surface active agents are the polyoxyethylene condensates of higher fatty acid amines and amides having from about 8 to 22 carbon atoms in the fatty alkyl or acyl group and about 10 to 30 ethenoxy units in the oxyethylene portion. Illustrative products are plant or animal, such as cashew fatty acid amines and amides condensed with about 10 to 30 moles of ethylene oxide.

Further suitable non-ionic surface active agents which are advantageously employed in the encapsulation solution of the present invention are generally the polyoxyalkylene adducts of hydrophobic bases wherein the oxygen/carbon atom ratio in the oxyalkylene portion of the molecule is greater than 0.40. Those compositions which are condensed with hydrophobic bases to provide a polyoxyalkylene portion having an oxygen/carbon atom ratio greater than 0.40 include ethylene oxide, butadiene dioxide and glycidol mixtures of these alkylene oxides with each other and with minor amounts of propylene oxide, butylene oxide, amylene oxide, styrene oxide, and other higher molecular weight alkylene oxides. Ethylene oxide, for example, is condensed with the hydrophobic base in an amount sufficient to impart water dispersibility or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates.

Typical hydrophobic bases which can be condensed with ethylene oxide in order to prepare non-ionic surface active agents include mono- and polyalkyl phenols, polyoxypropylene condensed with a base having from about 1 to 6 carbon atoms and at least one reactive hydrogen atom, fatty acids, fatty amines, fatty amides and fatty alcohols. The hydrocarbon ethers such as the benzyl or lower alkyl ether of the polyoxyethylene surfactant condensates are also advantageously employed in the compositions of the invention.

Among the suitable non-ionic surface active agents are the polyoxyethylene condensates of alkyl phenols having from about 6 to 20 carbon atoms in the alkyl portion and from about 5 to 30 ethenoxy groups in the polyoxyethylene radical. The alkyl substituent of the aromatic nucleus may be octyl, diamyl, n-dodecyl, polymerized propylene such as propylene tetramer and trimer, isoctyl, nonyl, etc. The benzyl ethers of the polyoxyethylene condensates of monoalkyl phenols impart good properties of the compositions of the invention and a typical product corresponds to the formula:

Higher polyalkyl oxyethylated phenols corresponding to the formula:

wherein R is hydrogen or an alkyl radical having from about 1 to 12 carbon atoms, R' and R'' are alkyl radicals having from about 6 to 16 carbon atoms and n has a value from about 10 to 40, are also suitable as non-ionic surface active agents. A typical oxyethylated polyalkyl phenol is dinonyl phenol condensed with 14 moles of ethylene oxide.

Other suitable non-ionic surface active agents are cogeneric mixtures of conjugated polyoxyalkylene compounds containing in their structure at least one hydrophobic oxyalkylene chain in which the oxygen/carbon atom ratio does not exceed 0.40 and at least one hydrophilic oxyalkylene chain in which the oxygen/carbon atom ratio is greater than 0.40.

Polymers of oxyalkylene groups obtained from propylene oxide, butylene oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains having an oxygen/carbon atom ratio not exceeding 0.40. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide and styrene oxide are illustrative of hydrophilic oxyalkylene chains having an oxygen/carbon atom ratio greater than 0.40.

Other suitable polyoxyalkylene non-ionic surface active agents are the alkylene oxide adducts of higher aliphatic alcohols and thioalcohols having from about 8 to 22 carbon atoms in the aliphatic portion and about 3 to 50 oxyalkylene portion. Typical products are synthetic fatty alcohols, such as n-decyl, n-undecyl, n-dodecyl, n-tridecyl, n-tetradecyl, n-hexadecyl, n-oxtadecyl and mixtures thereof condensed with 3 to 50 moles of ethylene oxide, a mixture of normal fatty alcohols condensed with 8 to 20 moles of ethylene oxide and capped with benzyl halide or an alkyl halide, a mixture of normal fatty alcohols condensed with 10 to 30 moles of a mixture of ethylene and propylene oxides, a mixture of several fatty alcohols condensed sequentially with 2 to 20 moles of ethylene oxide and 3 to 10 moles of propylene oxide, in either order; or a mixture of normal fatty alcohols condensed with a mixture of propylene and ethylene oxides, in which the oxygen/carbon atom ratio is less than 0.40 followed by a mixture of propylene and ethylene oxides in which the oxygen/carbon atom ratio is greater than 0.40 followed by a mixture of propylene and ethylene oxides in which the oxygen/carbon atom ratio is greater than 0.40 or a linear secondary alcohol condensed with 3 to 30 moles of ethylene oxide, or a linear secondary alcohol condensed with a mixture of propylene and ethylene oxides, or a linear secondary alcohol condensed with a mixture of ethylene, propylene, and higher alkylene oxides.

In practicing the present invention, the preferred non-ionic surfactant materials are non-ionic surfactants containing no alcohols or glycols which contains fatty acid and fatty acid derivatives. Such compounds, as noted, are well known and commercially available as spill containment media, such as that sold by S & S Company of Georgia, Inc. under the tradename CONTROL SOLVE. The material is a proprietary emulsion having the characteristics outlined in Table I.

TABLE I

| Typical Properties of CONTROL SOLVE 228 | |
|---|---|
| Boiling Point (at 760 mm Hg) | 200° F. |
| Specific Gravity ($H_2O$ = 1) | 1.0 |
| Volatile Content (% by volume) | 3.0 |
| pH | 7 |
| Appearance | Milky white emulsion |

The non-ionic surfactant material, CONTROL SOLVE, is commonly used for spill abatement and control, particularly on solid surfaces such as concrete. The material is commercially available in either an aqueous concentrate, a premixed use solution, or in its non-aqueous form under the trade designations the encapsulation solution CONTROL SOLVE 114, CONTROL SOLVE 228, and CONTROL SOLVE 111, respectively. In the preferred embodiment of the present invention, premixed use solutions are employed. However, either aqueous concentrate or non-aqueous material can be successfully employed in the encapsulation solution of the present invention as a source of appropriate non-ionic surfactant material.

The concentration of non-ionic surfactant employed in the encapsulation solution is that amount sufficient to interact with the major portion of target chemical contaminants to dissociate these materials from the soil matrix and render them amenable to sequestration and/or decomposition. It is to be appreciated that the optimum concentration of non-ionic surfactant will vary depending upon the level of soil contamination encountered. The concentration of non-ionic surfactant will be that amount sufficient to economically treat the major portion of the targeted chemical contaminants. The term "major portion" as used herein is defined as that amount of a given chemical contaminant which when treated will yield a contaminant concentration level below a predetermined or set value. This value may be derived from experimental data or may be one set by regulatory agencies such as the United States Environmental Protection Agency. It is also possible to further reduce chemical contaminant concentrations to levels below the limits of detection possible with current analytical methods. Such reduction would be readily ascertainable given the disclosure of the present invention.

While the concentration of non-ionic surfactant employed in the encapsulation solution of the present invention can be adjusted to treat various levels of chemical contaminant concentration, the non-ionic surfactant is generally present in an amount between about 10 and about 25.0% by total composition volume, with amounts between about 2.0 and about 10.0% by volume being preferred.

In order to ascertain a more specific concentration of non-ionic surfactant in the encapsulation solution of the present invention, attention is directed to the calibration steps of the present invention which are described in detail infra.

The non-ionic surfactant is maintained in a suitable aqueous carrier medium. The aqueous carrier medium envisioned herein is water which is essentially free of organic and inorganic chemical contaminants which would interfere with the remediation process of the present invention. In the preferred embodiment, water which has been deionized and distilled by conventional procedures is sufficiently free of chemical contaminants for purposes of the present invention.

The encapsulation solution of the present invention may be admixed in advance of application and stored in suitable vessels until needed. However, due to the variable nature of chemical contaminants in soil matrices, it is preferred that the encapsulation solution be prepared immediately prior to application with a non-ionic surfactant present in an amount which corresponds with the results obtained in the calibration step of the present invention. The calibration step will be described in greater detail infra.

While it is anticipated that the encapsulation solution and the soil remediation method of the present invention can be efficaciously employed to treat and remove a variety of chemical contaminants, it is anticipated that the process of the present invention is most advantageously employed to remove and render harmless certain chemical compounds which for purposes of this discussion will be classified as polyaromatic and monoaromatic hydrocarbons. As defined herein, this term is broadly defined as substituted and unsubstituted cyclical hydrocarbons having at least one napthenic or phenolic functionality associated therewith. Chemical contaminants which are specifically targeted for treatment by the process of the present invention include, but are not limited to organic compounds selected from the group consisting of napthalene, acenapthalene, acenapthene, fluorene, phenanthrene, anthracene, fluoranthene, pyrene, benz(a)anthracene, chrysene, benzo(b)fluoranthene, benzo(k)fluoranthene, benzo(a)pyrene, indeno (1,2,3-cd)pyrene, dibenz(a,h)anthracene, benzo(g,h,i)perylene, and mixtures thereof.

The process of the present invention is preferably a multistage method in which soil material to be treated is lifted from its original location by any conventional means such as a mechanical back hoe or the like and transported directly to the treatment device or to a suitable first stage pretreatment holding area where it can be directed into the treatment device as required. The soil to be treated can be any suitable soil, coarse sand, humus, clay-like or loam-like material. Optionally, prior to introduction into the treatment device, the soil material can be tilled or worked to break or shred large clods, if desired.

The soil to be treated is introduced in a continuous manner into a suitable mixing device such as a pug milling apparatus where it can be brought into contact with encapsulation solution containing specific amounts of non-ionic surfactant necessary to treat the concentration of chemical contaminants found in that particular soil matrix. The total volume of encapsulation solution employed is that amount sufficient to saturate the soil volume to be treated. As used herein the term "saturation" is defined as the amount of encapsulation solution which must be added to a given soil volume to yield an excess or run-off amount of encapsulation solution between about 25% and about 50% of the total soil volume per hour after 20 minutes of mixing. The material is mixed and macerated to ensure ultimate contact with the encapsulation solution.

Without being bound to any theory, it is believed that saturation with encapsulation solution not only insures that sufficient amounts of the active ingredients in the encapsulation solution are delivered to the soil sample; saturation also provides intimate contact of the soil matrix to which the chemical contaminants adhere with sufficient non-ionic surfactant to permit the preferential bonding of the contaminant compounds with the surfactant. Finally, it is also believed that copious amounts of encapsulation solution assist in preventing the reattachment of the contaminant compound to the soil matrix as well as providing a suitable carrier medium for removal of chemical contaminants entrained in the encapsulation solution.

The interval during which the encapsulation solution and the soil matrix being treated are mixed is one which is sufficient to facilitate encapsulation of a major portion of the targeted chemical contaminants to be treated and/or removed from the soil matrix. This interval can vary depending on the characteristics of the soil matrix to be treated. The concentration and type of contaminant present, and the overall removal effectiveness desired. In the preferred embodiment, mixing occurs for an interval sufficient to thoroughly saturate the soil matrix and form the slurry. In the preferred embodiment, mixing intervals between about 30 seconds to about 10 minutes are anticipated; with mixing intervals between about 1 and about 5 minutes being preferred.

Thorough mixture of the solution saturated soil is necessary to insure that intimate contact between the active encapsulation solution and the all surfaces of the soil matrix has been achieved. Mixture can be accomplished by any of a variety of methods such as vibration, shredding, agitation and the like. The method of choice will preferably reduce the volume and number of any clumps or agglomerations of soil particles and help prevent their reformation during mixture. In the preferred embodiment, a macerative process is employed in which the soil-solution mixture is shearingly agitated by at least one suitably configured shearing blade. Admixture of the soil and encapsulation solution is most effectively accomplished by at least one pair of counter-rotating mixing blades and/or pug milling device which operate on the soil-solution mixture in the manner found in a pug milling process. Excess encapsulation solution can be removed from contact with the soil matrix after mixing is completed. This can occur immediately after mixing is completed or after a first contact interval of about 2 to 20 minutes, with a contact interval of 5 to 10 minutes being preferred. The contact interval is that which is sufficient to permit reaction between a major portion of the chemical contaminants and the non-ionic surfactant.

In the process of the present invention, the initial contact interval terminates with the separation of the excess encapsulation solution from the soil matrix. Separation may occur at any time subsequent to mixing. In the preferred embodiment, separation occurs immediately prior to discharge from the mixing device. However, it is anticipated that the encapsulation solution may be removed in separate processing devices if desired. Separation and removal of excess encapsulation solution from the soil matrix can be accomplished by a variety of suitable methods which include, but are not limited to, staged evaporative processes and mechanical water separation techniques.

Separation process such as those envisioned for use in the process of the present invention need not remove the encapsulation solution in its entirety. In the preferred embodiment of the present invention a portion of the encapsulation solution is retained in the soil after it is returned to a second staging area on the treatment site. Once in place in the soil, the residual encapsulation solution continues to act on any contaminants bonded thereto rendering them susceptible to the decomposition action of aerobic and anaerobic bacteria present or specifically introduced into the soil.

Without being bound to any theory, it is believed that the chemical process which takes place during the contact/mixing interval is one of bioencapsulation. Aromatic compounds such as the target chemical contaminants are attached to the soil matrix by some kind of relatively weak bonding force such as Vanderwall interaction. It is believed that this interaction most probably occurs between the aromatic portion of the chemical contaminant and the soil matrix. Plain water also exhibits a minor degree of affinity to the chemical contaminant materials. However, the interactive force between water and aromatic is so much weaker than that exhibited between the soil matrix and the aromatics that the quantity of aromatic compounds removed from the soil matrix by plain water does not appreciably lower the soil contaminant level. It is theorized that non-ionic surfactant materials such as those defined in the present invention, when added to water, increase the solution affinity of the resulting encapsulation material for aromatic hydrocarbons to a level which exceeds that exhibited between the aromatic and the soil matrix.

It is also believed that the non-ionic surfactants employed herein have a hydrophobic portion which actively associates with the aromatic compounds contained on or in the soil matrix. The hydrophilic portion of the surfactant serves to solubilize the heretofore water insoluble aromatic material to the extent that the aromatic-organic complex can remain suspended in the aqueous medium for an interval sufficient to permit separation of the solution from contact with the soil matrix. Within the purview of this invention, suspension can be in the form of a true solution, an emulsion or a stable suspension.

It has been unexpectedly discovered that aromatic compounds such as those defined herein are rendered susceptible to chemical decomposition when associated with non-ionic surfactants defined herein and encapsulated in the process of the present invention. Without being bound to any theory, it is believed that the bonding and encapsulation of the hydrocarbon contaminants which occur in the process of the present invention renders the compounds more susceptible to naturally occurring biochemical, mechanical and physical degradative processes such as would occur by microbial action, ultraviolet radiation, exposure to elevated temperature levels and the like. It is believed that the interaction bonding process which is exhibited between the surfactant and the chemical contaminants is an affirmative biochemical encapsulation in which carbon-carbon bonds present in the chemical contaminant compound are abruptly broken thereby increasing the water solubility of the molecule and rendering more susceptible to further breakdown.

Thus, the process of the present invention provides a method whereby large quantities of chemical contaminants can be removed from the contaminated-soil matrix through the introduction of encapsulation solution mixing and separation steps. The initial steps of the process of the present invention, provides in chemical contaminant levels sufficient to stabilize the soil matrix against further contaminant leaching or migration. The residual encapsulation solution remaining in the soil matrix after processing is completed provides a material to which any residual contaminant can bond rendering the contaminant amenable to action by aerobic and anaerobic bacteria, present or purposely introduced into the soil matrix.

The concentration of non-ionic surfactant present in the encapsulation solution can be varied depending upon the contamination level and general condition of the soil matrix. In order to determine the appropriate concentration of non-ionic surfactant in the encapsulation solution for a particular application the process of the present invention preferably includes a calibration procedure to provide suitable analytical data on which to base calculations of the appropriate concentration range for the non-ionic surfactant in the encapsulation solution. In the calibration procedure of the process of the present invention at least one representative sample of the contaminated soil matrix is obtained.

The representative soil sample may be obtained by any suitable, reliable reproducible method. In the preferred embodiment, a sample or series of samples are obtained by the method outlined in Michigan Public Act Number 478 of 1988 as amended by Public Act Number 150 of 1989. These samples are analyzed by conventional methods to determine the area of greatest chemical contamination within the defined site. Suitable methods are defined in EPA Method 3540 and 8270.

The exact weight of the samples tested can be any amount which will provide sufficient levels of extracted chemical contaminant for accurate analysis by any of a variety of known and accepted analytical procedures. Examples of these procedures include infrared analysis, gas chromatography, mass spectroscopy, gas chromatograph/mass spectroscopy and the like. In general relatively small samples sizes can be employed. In the preferred embodiment, sample sizes between about 5 and about 25 grams can be employed.

Once the maximum contaminant concentration of the soil has been determined, the concentration of the encapsulation solution can be calibrated against this standard. To accomplish this, a calibration sample can be treated in a series of preliminary bench top runs to determine the effectiveness of the given concentration of the encapsulation solution. The calibration sample is washed with a test encapsulation solution having an initial concentration of non-ionic surfactant equal to [S].

The value [S] is graphically represented in FIG. 2. The value [S] is derived from the relationship between contaminant concentration in the soil matrix and the concentration of non-ionic surfactant necessary to obtain complete closure. The combined contaminant concentration is experimentally derived. The concentration of non-ionic surfactant necessary to reduce the concentration of target chemical contamination below detection limits in 90% of the samples tested.

Once the value [S] is determined, the efficacy of the initial non-ionic surfactant concentration value can be experimentally verified in the following manner.

In the calibration procedure of the present invention, the initial calibration sample is washed with encapsulation solution containing a concentration of non-ionic surfactant equal to [S] while being mechanically agitated in a manner which ensures intimate contact between the washing encapsulation solution and the soil matrix. For bench scale operations, this agitation can be supplied by a rotary mixer. Mixing and contact continue for an interval which is sufficient to permit association of the chemical contaminants heretofore entrained in the soil matrix with the non-ionic surfactant and to approximate field conditions. In general the interval in which the calibration sample is saturated with encapsulation solution is between about 1 and about 20 minutes; with an interval between about 5 and about 10 minutes being preferred.

The resulting encapsulation solution wash is then removed from contact with the soil sample by any suitable means such as rotary vacuum evaporation. The soil sample is then extracted with a suitable solvent in the manner described previously to preferentially extract any targeted chemical contaminants remaining on the soil matrix after treatment.

The resulting extract is then prepared and analyzed by a suitable method as defined in accepted analytical literature to determine the effectiveness of the treatment method. If complete closure has been obtained i.e. the chemical contamination level has been reduced to an acceptable predetermined level; either that non-ionic surfactant concentration level can be employed as a standard to formulate an effective use solution or the non-ionic surfactant concentration can be literally reduced and tested on further calibration samples to obtain the optimum concentration level for use in the effective treatment level.

Where unacceptable levels of contamination are still evident after initial treatment of the calibration sample, the level of non-ionic surfactant in the encapsulation is incrementally increased in relationship with the excess contaminant concentration to provide a modified encapsulation solution with a level of surfactant effective to treat the given soil matrix. While this iterative variation can occur in a hit or miss fashion, it has been found that it is most advantageous to interactively increase or decrease the concentration of non-ionic surfactant in increments between about 0.2 and about 1.0% by volume until an optimally effective encapsulation solution is obtained. In the preferred embodiment the increments are about 0.5 vol. %

To further illustrate the process of the present invention, attention is directed to the following Examples. The Examples are included for illustrative purposes and are not to be construed as limitative of the present invention.

EXAMPLE I

In order to determine the initial level of chemical contaminant present in a soil matrix obtained from an industrial site in Western Michigan, a 10.10 gram sample was extracted and analyzed for the presence of polynucleated aromatics following the procedures outlined in EPA Test Method 3540 and EPA Analytical Method 8270 using Methylene Chloride as the extraction solvent. The results are listed in Table II.

EXAMPLE II

A second sample of soil matrix weighing 10.2 grams was obtained from the Western Michigan Industrial site discussed in Example I. The sample was treated by the process of the present invention as outlined.

An encapsulation solution as defined in the present invention was prepared by the admixture of 2 parts deionized water to 1 part CONTROL SOLVE 228 commercially available from S&S Company of Georgia, Albany Georgia to make 25 ml of encapsulation solution having a non-ionic surfactant concentration of 2.0% by volume. The encapsulation solution was then admixed with the soil sample and agitated in a closed vessel by rapid shaking for an interval of two minutes.

The encapsulation solution was, then, separated from the soil by vacuum filtration. The soil sample was, then, dried, by admixture with sodium sulfate in preparation for subsequent analytical procedures. The sample was, then, prepared by the process outlined in EPA Method 3540 and the resulting extract analyzed by the EPA method for analysis of aromatic hydrocarbons (EPA Method 8260: SW-846). The results are set forth in Table II.

As can be seen by the results set forth, the procedure achieved significant reduction in the contaminant concentration in the soil matrix.

EXAMPLE III

A third sample of soil matrix weighing 10.2 grams was obtained from the Western Michigan Industrial site discussed in Example I. The sample was treated with an encapsulation solution prepared in the manner outlined in Example II to contain 2.5% by volume surfactant. The method of soil treatment is outlined in Example II.

The results of the treatment were obtained by the analytical method outlined in Example II and are set forth in Table II.

As can be seen from these results, effective closure has been obtained.

EXAMPLE IV

A 600 cubic yard sample of soil matrix weighing approximately 900 tons or 914,442.3 kg is obtained from the Western Michigan Industrial site. The soil is continuously introduced into a Midland Mix-Trailer Pug Milling device Model Number T-4100, commercially available from Midland Asphalt Corporation of Victor, N.Y. at a rate sufficient to process the total sample in one hour. Encapsulation solution prepared as outlined in Example III is introduced into contact with the soil as it enters the mixing chamber. The amount of encapsulation solution introduced is sufficient to thoroughly saturate the soil sample (approximately 36,226 gallons).

After a mixing interval of 1.5 minutes, the encapsulation solution is removed from the soil sample by mechanical screening. The processed soil is analyzed for target aromatic contaminants by routine EPA methods. No detectable levels of contaminants are found.

TABLE II

| | Chemical Contaminant Assay | | |
|---|---|---|---|
| | Concentration (ppb) | | |
| Compound | Prior to Treatment | After 1st Iteration | After 2nd Iteration |
| Naphthalene | 4003.1 | 404.2 | BDL |
| Acenaphthalene | BDL | BDL | BDL |
| Acenaphthene | BDL | BDL | BDL |

TABLE II-continued

| | Chemical Contaminant Assay | | |
|---|---|---|---|
| | Concentration (ppb) | | |
| Compound | Prior to Treatment | After 1st Iteration | After 2nd Iteration |
| Fluorene | 4974.5 | BDL | BDL |
| Phenanthrene | 6430.6 | BDL | BDL |
| Anthracene | BDL | BDL | BDL |
| Fluoranthene | 5854.3 | BDL | BDL |
| Pyrene | BDL | BDL | BDL |
| Benz(a)anthracene | BDL | BDL | BDL |
| Chrysene | BDL | BDL | BDL |
| Benzo(b)fluoranthene | BDL | BDL | BDL |
| Benzo(k)fluoranthene | BDL | BDL | BDL |
| Benzo(a)pyrene | BDL | BDL | BDL |
| Indeno[1,2,3-c,d]pyrene | BDL | BDL | BDL |
| Dibenz(a,h)anthracene | BDL | BDL | BDL |
| Benzo(g,h,i)perylene | BDL | BDL | BDL |

BDL - Below Detection Limits (less than 330 ppb)

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A process for treating a process stream having a soil matrix containing aromatic organic chemical contaminants comprising the steps of:

introducing an encapsulation solution into contact with the process stream, said encapsulation solution capable of preferential attraction to the aromatic organic chemical contaminants contained in the soil matrix of the process stream such that at least a portion of the aromatic organic chemical contaminants are rendered susceptible to degradative interaction with natural biological and chemical constituents, said encapsulation solution consisting essentially of an effective amount of non-ionic surfactant material and water;

removing a first portion of said introduced encapsulation solution from contact with the process stream after an interval sufficient to initiate interaction between said encapsulation solution and said aromatic organic chemical contaminants;

retaining a second portion of said introduced encapsulation solution in contact with the process stream; and removing the process stream and said second portion of said encapsulation solution to a post-treatment staging area.

2. The process of claim 1 further comprising the step of:

ascertaining said effective amount of said non-ionic surfactant present in said encapsulation solution sufficient to preferentially dissociate said aromatic organic chemical contaminants from contact with the soil matrix of the process stream and to render at least a portion of the aromatic organic chemical contaminants susceptible to degradative interaction with natural biological and chemical constituents, said ascertainment step occurring prior to contacting the process stream with said encapsulation solution.

3. The process of claim 2 wherein said ascertainment step further comprises the steps of:

removing at least one representative sample of contaminated process stream from the process stream;

reacting said representative sample stream of the process stream with a measured quantity of an encapsulation test solution, said encapsulation solution consisting essentially of:
a) a predetermined amount of non-ionic surfactant, said predetermined amount of surfactant being present in a specific concentration between about 1.0 and about 2.5% by total encapsulation solution volume; and
b) water;

analyzing said sample after said reaction step to determine treatment effectiveness of said encapsulation test solution;

quantifying said analyzed treatment effectiveness as a numerical datum;

varying said specific concentration of said non-ionic surfactant by an incremental value between about 10% and about 20% of said predetermined amount of said non-ionic surfactant, said variation in specific concentration being a function of said numerical datum derived in said quantifying step;

repeating said reaction step with an additional representative sample of said process stream with an additional quantity of encapsulation test solution having said varied specific concentration of said non-ionic surfactant based upon said numerical datum and analyzing said additional sample to determine treatment effectiveness of said additional varied encapsulation test solution;

continuing to repeat said previous reaction step with additional quantities of modified encapsulation test solution until a predetermined level of effectiveness has been achieved.

4. A process for reducing aromatic chemical contamination in a fluidizable soil matrix comprising the steps of:

introducing an encapsulation solution into contact with the fluidizable matrix containing aromatic organic chemical contaminants, said encapsulation solution introduced in an amount sufficient to form a saturated soil matrix/encapsulation solution admixture, said encapsulation solution having a non-ionic surfactant material constituent capable of preferential attraction to the aromatic organic chemical contaminants contained in the fluidizable matrix to form a complex between the said aromatic organic chemical contaminants and said non-ionic surfactant in said soil matrix/encapsulation solution admixture, said contaminant/surfactant complex thus formed being susceptible to decomposition by naturally occurring degradative processes, said encapsulation solution consisting essentially of said non-ionic surfactant material and water;

agitating said admixture for an interval sufficient to permit the aromatic organic chemical contaminants to preferentially dissociate from contact with said matrix in favor of formation of said contaminant/surfactant complex in said encapsulation solution and initiate decomposition of the aromatic organic chemical contaminants;

performing a separation operation on said matrix/encapsulation solution admixture to remove a major portion of said encapsulation solution containing contaminant/surfactant complex therein from contact with said soil matrix/encapsulation solution admixture; and removing said separated soil matrix/encapsulation solution admixture to a suitable post-treatment staging area after said separation operation to permit further expedited naturally occurring degradative processes to occur.

5. The process of claim 4 further comprising the step of determining said effective concentration of said non-ionic surfactant present in said encapsulation solution necessary to preferentially dissociate said chemical contaminants from contact with a representative sample of said matrix prior to introduction of said encapsulation solution into contact with a major portion of the soil matrix.

6. The process of claim 5 wherein determination of said effective concentration of said non-ionic surfactant further comprises the steps of:

experimentally determining an average contamination level for the fluidizable matrix;

washing a representative sample of the soil matrix with a measured quantity of encapsulation test solution, said encapsulation test solution consisting essentially of a concentration of non-ionic surfactant fixed between 1.0 and about 2.5% by volume in water;

analyzing said washed fluidizable matrix to ascertain effectiveness of said encapsulation washing step in removing the organic chemical contaminants; and varying concentration on non-ionic surfactant upward by incremental values of between about 10% and about 20% and repeating said encapsulation solution washing step and said analysis step on additional representative samples of the fluidizable matrix until the aromatic organic contaminants are present at a level below a predetermined desired concentration level.

7. The process of claim 4 wherein said organic chemical contaminant is an aromatic organic having at least one aromatic functionality selected from the group consisting of napthalene, acenapthalene, acenapthene, fluorene, phenanthrene, anthracene, fluoranthene, pyrene, benz(a)anthracene, chrysene, benzo(b)fluoranthene, benzo(k)fluoranthene, benzo(a)pyrene, indeno(1,2,3-c,d)pyrene, dibenz(a,h)anthracene, benzo(g,-h,i)perylene, and mixtures thereof.

8. The process of claim 4 wherein said matrix is processed at a rate between about 200 and about 1500 cubic yards per hour.

9. The process of claim 4 wherein said matrix is processed at a rate up to approximately 600 cubic yards per hour.

10. The process of claim 4 wherein removal of said encapsulation solution is accomplished by evaporation.

11. The process of claim 4 wherein removal of said encapsulation solution is accomplished by mechanical water separation.

12. The process of claim 4 wherein introduction of said fluidizable matrix and agitation of said matrix/encapsulation solution admixture occurs in a milling device having a plurality of counter-rotating mixing blades.

13. The process of claim 4 wherein said fluidizable matrix is soil.

14. A process for reducing chemical contamination in a fluidizable soil matrix comprising the steps of:

introducing an encapsulation solution into contact with the fluidizable soil matrix containing aromatic chemical contaminants, said encapsulation solution introduced in an amount sufficient to form a saturated admixture with the soil matrix, said encapsulation solution consisting essentially of non-ionic surfactant and water;

mechanically agitating said admixture for an interval sufficient to permit said aromatic chemical contaminants to preferentially dissociate from contact with the soil matrix and to form surfactant/contaminant complexes having an aromatic chemical contaminant portion exhibiting increased susceptibility to decomposition by naturally occurring degradative processes; and removing a major portion of said encapsulation solution from contact with the soil matrix.

15. The process of claim 14 further comprising the step of ascertaining said effective amount of said non-ionic surfactant present in said encapsulation solution necessary to preferentially dissociate said chemical contaminants from contact with the soil matrix, said ascertainment step comprising:

washing a sample of the matrix with a measured quantity of encapsulation test solution to obtain an encapsulation wash anylant, said encapsulation test solution consisting essentially of between about 1.0 and about 2.5% by volume non-ionic surfactant in water;

ascertaining effectiveness of said encapsulation washing step in removing essentially target chemical contaminants; and varying concentration of said non-ionic surfactant upward by incremental values of between about 10% and about 20% and repeating said deionized water and encapsulation solution washing steps on addition samples of said matrix until said target chemical contaminants are present at below a predetermined desired concentration level.

16. The process of claim 14 wherein said chemical contaminants are aromatic organic compounds having at least one aromatic functionality selected from the group consisting of naphthalene, acenapthalene, acenapthene, fluorene, phenanthrene, anthracene, fluoranthene, pyrene, benz(a)anthracene, chrysene, benzo(b)fluoranthene, benzo(k)fluoranthene, benzo(a)pyrene, indeno(1,2,3-c,d)pyrene, dibenz(a,h)anthracene, benzo(g,h,i)perylene, and mixtures thereof.

17. The process of claim 14 wherein the fluidizable soil matrix is processed at a rate between about 200 and about 1500 cubic yards per hour and said introduction of said encapsulation solution into the fluidizable soil matrix and agitation of said matrix/encapsulation solution admixture occurs in a milling device having a plurality of counter-rotating mixing blades.

18. The process of claim 14 wherein said non-ionic surfactant is a material having an HLB value between about 3.5 and about 20.0 selected from the group consisting of polyoxyethylene esters of fatty acids having acyl groups with between 8 and 22 carbon atoms and oxyethylene portions with between 8 and 30 ethenoxy units, polyoxyethylene condensates of fatty acid amines having fatty alkyl groups with between 8 and 22 carbon atoms and oxyethylene portions with between 10 and 30 ethenoxy units, polyoxyethylene condensates of fatty acid amines having acyl groups with between 8 and 22 carbon atoms and oxyethylene portions with between 10 and 30 ethenoxy units, and mixtures thereof.

19. The process of claim 18 wherein a minor portion of encapsulation solution is retained in contact with the soil matrix in an amount sufficient to stabilize the matrix against chemical leaching and render organic chemical contaminants which remain in the soil matrix amenable to naturally occurring degradative processes.

* * * * *